(12) United States Patent
Hall et al.

(10) Patent No.: US 9,032,303 B2
(45) Date of Patent: May 12, 2015

(54) WEB-BASED INTERACTION WITH A LOCAL SYSTEM

(75) Inventors: Michael Hall, Snohomish, WA (US); Andrew Lovitt, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 39 days.

(21) Appl. No.: 13/407,218

(22) Filed: Feb. 28, 2012

(65) Prior Publication Data

US 2013/0227424 A1    Aug. 29, 2013

(51) Int. Cl.
| | |
|---|---|
| *G06F 3/01* | (2006.01) |
| *G06F 15/16* | (2006.01) |
| *G06F 21/00* | (2013.01) |
| *G06F 9/46* | (2006.01) |
| *G06F 17/30* | (2006.01) |
| *G06F 21/31* | (2013.01) |
| *H04L 12/16* | (2006.01) |
| *H04L 29/08* | (2006.01) |
| *H04N 7/18* | (2006.01) |
| *H04W 4/02* | (2009.01) |

(52) U.S. Cl.
CPC .............. *G06F 17/30* (2013.01); *G06F 21/31* (2013.01); *H04L 12/16* (2013.01); *H04L 67/00* (2013.01); *H04L 67/025* (2013.01); *H04N 7/18* (2013.01); *H04W 4/02* (2013.01)

(58) Field of Classification Search
CPC .................. G06F 21/53; G06F 21/629; G06F 2221/2149; G06F 21/6218; G06F 21/00; G06F 17/3089; H04L 67/28; H04L 67/02; H04L 69/08
USPC ................... 726/11, 12, 26, 29; 715/234, 740; 709/203
See application file for complete search history.

(56) References Cited

U.S. PATENT DOCUMENTS

| | | | | |
|---|---|---|---|---|
| 8,478,798 | B2* | 7/2013 | Uhrhane et al. | 707/822 |
| 2006/0212514 | A1* | 9/2006 | Saillet | 709/203 |
| 2009/0282474 | A1* | 11/2009 | Chen et al. | 726/21 |
| 2010/0057834 | A1* | 3/2010 | Macken et al. | 709/203 |

(Continued)

OTHER PUBLICATIONS

Adamski, Lucas, "Introducing the Adobe AIR Security Model", Published on: Feb. 25, 2008, Available at: http://www.adobe.com/devnet/air/articles/introduction_to_air_security.html.

(Continued)

*Primary Examiner* — Amy Ng
*Assistant Examiner* — Sang H Kim
(74) *Attorney, Agent, or Firm* — Daniel Choi; Judy Yee; Micky Minhas

(57) ABSTRACT

Systems, methods, and computer program products for facilitating web-based interaction with a local system are disclosed. Such systems, methods, and computer program products provide an approach that allows a web client within in a web browser environment to access local hardware and local software—via a web server contained in the local system—in a local computer system. In response to a user input, the web client directs local hardware and local software to perform actions (e.g., writing files and taking pictures). Information related to such actions is returned to the web client via the local web server. The local computer system may be remotely located from the web client and such returned information may be stored and/or executed at a remote site (e.g., cloud database). Security layers may be provided to authenticate the user as well as user permissions for accessing the local computer system.

20 Claims, 9 Drawing Sheets

(56) References Cited

U.S. PATENT DOCUMENTS

| | | |
|---|---|---|
| 2010/0146523 A1* | 6/2010 | Brigaut et al. ............... 719/330 |
| 2010/0153948 A1* | 6/2010 | Schreiber et al. ............ 718/1 |
| 2011/0016169 A1* | 1/2011 | Cahill et al. ................ 709/203 |
| 2013/0091197 A1* | 4/2013 | Bar-Zeev et al. ............ 709/203 |
| 2013/0205217 A1* | 8/2013 | Schuller ..................... 715/739 |

OTHER PUBLICATIONS

Fairhead, Harry, "Getting Started with PhoneGap", Published on: Sep. 13, 2011, Available at: http://www.i-programmer.info/programming/mobile/3037-getting-started-with-phonegap.html.

"STB Software", Retrieved on: Dec. 8, 2011, Available at: http://www.interoud.com/index.php?page=stb-software.

Fulton, III, Scott M., "Build 2011: What is WinRT, and Is Silverlight Dead?", Published on: Sep. 13, 2011, Available at: http://www.readwriteweb.com/hack/2011/09/build-2011-what-is-winrt-and-i.php.

"Free Linux Browser Libraries Boost Widgets", Retrieved on: Dec. 7, 2011, Available at: http://www.linuxfordevices.com/c/a/News/Free-Linux-browser-libraries-boost-widgets/.

"Overview of HP webOS", Retrieved on: Dec. 7, 2011, Available at: https://developer.palm.com/content/resources/develop/overview_of_webos/overview_of_webos.html.

* cited by examiner

WEB-BASED INTERACTION WITH A LOCAL SYSTEM

FIELD OF THE DISCLOSURE

The present disclosure generally relates to remote access interfaces and more particularly to systems, methods, and computer program products for facilitating web-based interaction with a local computer system.

BACKGROUND

Developers typically design Internet websites to be platform agnostic. This is done using web-based programming models, such as HyperText Markup Language (HTML), HyperText Markup Language Ver. 5(HTML5), or Cascading Style Sheets (CSS), representational state transfer web services, the JavaScript® scripting language from Oracle America, Inc. of Redwood shores, California, and the like. Such agnostic platform design allows all website visitors (i.e., users) to have a consistent experience regardless of the web browser application, computer operating system, and hardware platform employed by such various users. Similarly, web-based applications (e.g., Flash games, video players, audio players, mortgage calculators, etc.) are designed such that the programming model of the web-based application has a consistent experience for all users across all computing platforms. Alternatively, the developer may choose to limit the computing platform(s) the web-based application may be accessed from (e.g., by enforcing a "smartphones only" or a "tablet computers only" policy).

Generally, web browsers and web browser environments provide an isolated, Consistent rendering and application programming interface (API) for web-based applications that does not provide access to the computing device's underlying and/or local system device drivers, services, and/or operating system APIs. Rather, web-based programming models provide an isolated environment in which web-based applications can provide a defined set of functionality across a variety of computing device platforms. This is because if these web-based applications' software code were freely allowed to download and execute on the user's computing device, the software code could maliciously expose the memory, personal data, and/or operating system resources of the local computing device. Thus, in order to avoid compromising the user's computing device (or even remote computing devices in network communications with the user's computing device) from unknown, untrusted, and/or untested software code, these web-based applications often run in an isolated environment within the web browser environment.

Put another way, the isolated environment described above prevents web-based applications from accessing or making use of any underlying operating system services (e.g., drivers, APIs, reading and writing files, controlling input devices, etc.). Such an isolated environment, implemented by the above-mentioned web-based programming models, allows web-based applications to operate with limited, tightly-controlled resources. Thus, network access and access to the host system and operating system services are typically unavailable and/or prohibited.

SUMMARY

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

The present disclosure provides methods, systems, and computer program products that facilitate web-based interaction with a local computer system. In an embodiment, a component detects a user input made within a web-based application (i.e., client or client application). The client is located within a web browser environment. The user input indicates a user-desired action at a local system, such as taking a picture using a local system's camera. In an embodiment, the local system is remotely located from the user's computing device. In response to the user input, the client causes its local system interface component to transmit a request signal—based upon the user input—to the local system. The client receives a response signal from the local system, which contains information related to a requested action specified by the user input.

In an embodiment, the user input initially requests an action to be taken on local hardware and local software. Data is then transferred to a web-based service and a component of the client determines whether the client needs to contact a remote server. If communication with a remote server is required, a remote server interface component of the client sends a signal—containing desired information—to the remote server.

In yet another embodiment, security layers may be provided when a module determines whether the requested action—based upon the user input—is a permissible action. Such security layers (authorization process(es)) may be implemented via a single step or multiple steps. Further, such authorization process(es) may be performed on a per-application basis, per-device basis, or "all-or-nothing" basis.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the detailed description set forth below when taken in conjunction with the drawings in which like reference numbers indicate identical or functionally similar elements.

DETAILED DESCRIPTION

The present disclosure is directed to methods, systems, and computer program products for facilitating web-based interaction with a local computer system.

Figure 1:
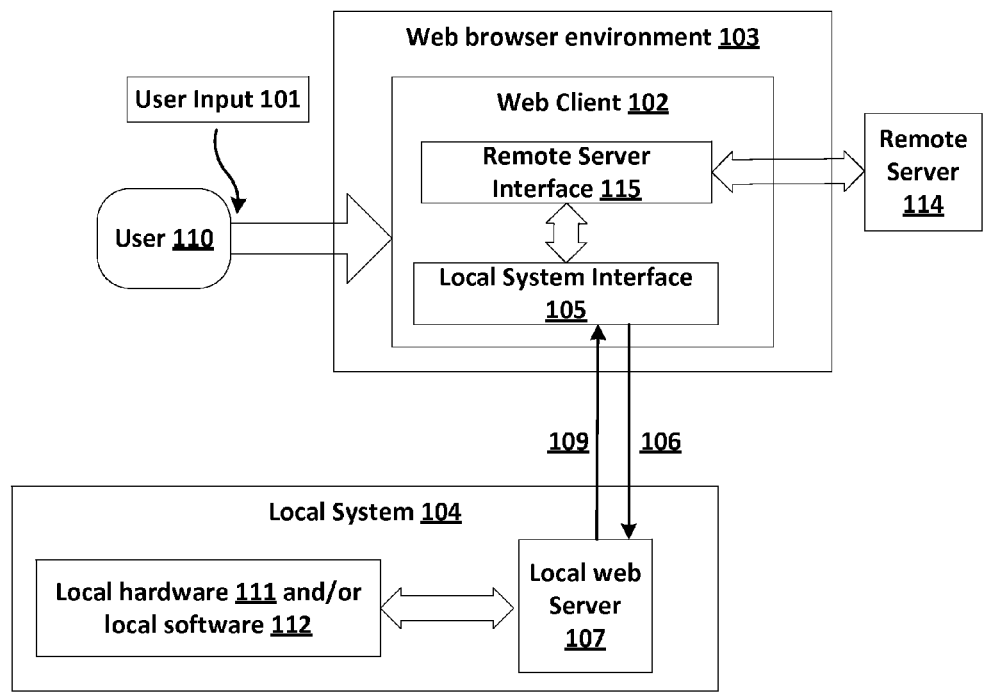
FIG. 1 is a block diagram illustrating an interrelationship between exemplary components that facilitate web-based interaction with a local system, according to an embodiment of the present disclosure.

Referring to FIG. 1, a block diagram illustrating an interrelationship between exemplary components that facilitate web-based interaction with a local system, according to various embodiments of the present disclosure, is shown. Configuration 100 depicts local system 104 containing a local web server 107, local hardware 111, and local software 112 accessed by a web client 102. Local web server 107 communicates with local system interface 105, local hardware 111, and local software 112. Web client 102 contains software modules for controlling operations of remote server interface 115 and local system interface 105. Remote server interface 115 communicates with remote server 114 and local system interface 105.

In various embodiments, the methods, systems, and computer program products of the present disclosure provide an isolated web-based application, also referred to as web client 102, operating within a web browser environment 103 capable of accessing local system 104. Interaction is accomplished via a local system interface 105—located within web browser environment 103—that is located within web client 102 in communication with local web server 107, which is located at and operated by local system 104. For the purposes of this disclosure, "local system" 104 is the computing device or devices that web client 102 accesses.

In an embodiment, local system 104 preferably includes computing devices equipped with local software 112 and/or local hardware 111 (e.g., cameras; scanners; global positioning system (GPS) antennae; motors; heat, light, motion or other sensors; etc.). In an embodiment, local system 104 preferably includes computing devices capable of locally reading and writing data (e.g., media player, audio/video player, etc.). In an embodiment, web client 102 communicates with remote server 114 to facilitate a web-based service, as specified by user input 101 from user 110 at a user interface screen of web client 102. In yet another embodiment, security layers are provided to authenticate user requests (i.e., user input 101), thereby controlling access to local system 104. The authentication process limits access to local system 104 via local web server 107.

In an embodiment, web client 102 operates within web browser environment 103. In an embodiment, web browser environment 103 is a web browser optimized for operating on a portable electronic device (e.g., mobile phone, slate, laptop, etc.). In an embodiment, web browser environment 103 operates on a stationary electronic device (e.g., standalone computing device, enterprise computing device, workstation, etc.). In such an embodiment, web client 102 includes one or more local system interface 105 modules and remote server interface 115 modules. These modules 105, 115 communicate with one or more local systems 104 and remote servers 114, respectively. Modules 105, 115 generate and send signals in response to directives from web client 102 and receive signals from local systems 104 and remote servers 114, respectively.

In an embodiment, modules 105, 115 are portions of software code contained within web client 102 for facilitating communication with their designated targets (i.e., local systems 104 and remote servers 114). In an embodiment, local system interface 105 and remote server interface 115 are part of an API designed to allow web client 102, within web browser environment 103, to access specific local system 104 services. In an embodiment, local system interface 105 module and remote server interface 115 module may be part of web client 102. In an embodiment, local system interface 105 contains selected portions of an API required to communicate with local system 104 and/or remote server 114. That is, when a developer has designed web client 102 to interact with only a portion of local system 104, it is unnecessary to implement all portions of software code to communicate with local system 104.

In an embodiment, web client 102 utilizes local system interface 105 to communicate with local system 104. Local system interface 105 generates and transmits request signals 106 to local web server 107, located on, and operated by, local system 104. In an embodiment, local system interface 105 provides additional APIs that facilitate interaction with local system 104 without additional developer knowledge of the local system 104 configuration (e.g., HTML, HTML5, CSS, representational state transfer web services, JavaScript, etc.).

In an embodiment, local web server 107 is a component of local system 104 that allows access to local hardware 111 and local software 112 of local system 104. Local hardware 111 may include hardware capable of being operated at least in part by a computing device. Local hardware 111 may include internal and external input and output devices of local system 104 (e.g., cameras, scanners, global positioning system antennae, motors, sensors, etc.) In an embodiment, local hardware 111 may include device drivers and APIs associated with the above-listed devices. Local software 112 may include all software capable of running on a computing device (e.g., operating system contained on local system 104 and its services, APIs, third-party application programs, other computing services, etc.). In an embodiment, local software 112 includes a digital, modifiable calendar. In yet another embodiment, local software 112 includes a service that facilitates reading and writing files contained on local hardware 111.

In an embodiment, local web server 107 is a component of an operating system executing on local system 104. In an embodiment, local web server 107 may be a separate software program from the operating system, provided by the same and/or different developers of the operating system. In an embodiment, local web server 107 accesses local hardware 111 and local software 112 via application development models that have direct knowledge of the operating system (e.g., C/C++, Win32, MFC, .NET Framework, APIs exposed through software development kits, etc.).

In an embodiment, local web server 107 is capable of returning response signals 109 to local system interface 105 of web client 102. That is, local web server 107 sends signals to local hardware 111 and local software 112, which cause local hardware 111 and local software 112 to perform the desired action, as specified by user input 101. Local hardware 111 and local software 112 returns information—related to the desired action—to local web server 107. Local web server 107 then generates response signals 109 containing information related to the desired action, which was carried out by local hardware 111 and local software 112. Response signal 109 is sent by local web server 107 to local system interface 105 located at web client 102 in web browser environment 103. These software modules allow APIs of web client 102 in web browser environment 103 to access local system 104 and utilize the local system services of local hardware 111 and local software 112.

Figure 2:
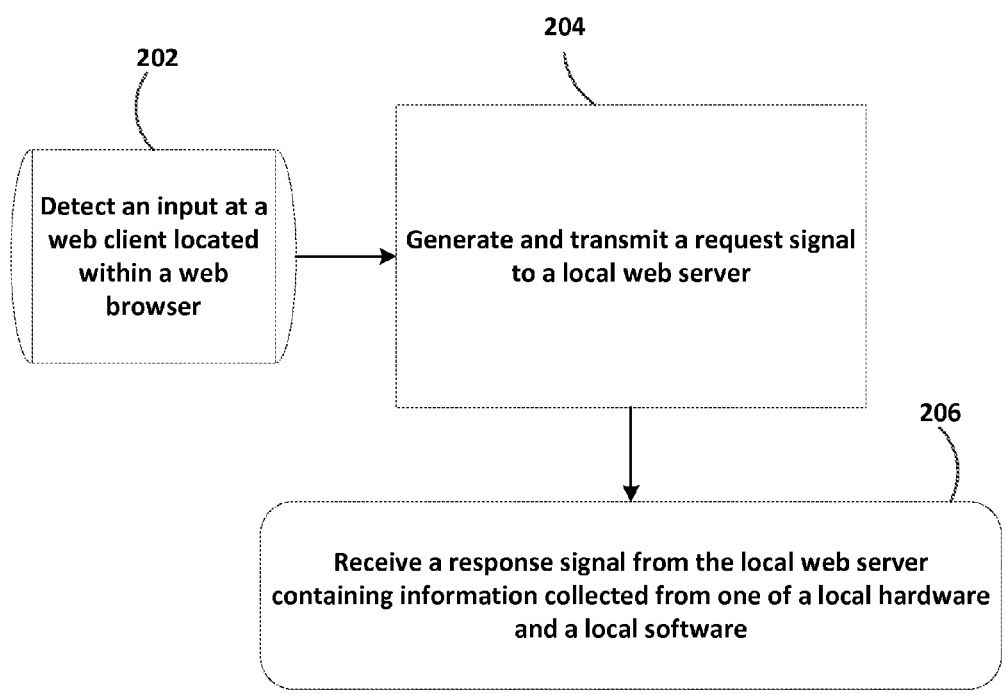
FIG. 2 is a flowchart illustrating an exemplary process for facilitating web-based interaction with a local system, according to an embodiment of the present disclosure.

Referring to FIG. 2, a flowchart illustrating an exemplary process 200 for facilitating web-based interaction with a local system, according to an embodiment of the present disclosure, is shown. In step 202, a user input 101 is received at web client 102. In an embodiment, user input 101 is from a user 110 indicating a desired action to initiate via the graphical user interface (GUI) of web client 102. (As will be appreciated by those skilled in the relevant art(s) after reading the description herein, user input 101 may be communicated to web client 102 by a computing device remotely located from web client 102.)

In step 204, web client 102 utilizes local system interface 105 to communicate with local system 104. That is, local system interface 105 generates and transmits one or more request signals 106 to local web server 107 located on local system 104.

Then, in step 206, local web server 107 returns one or more response signals 109 to local system interface 105 of web client 102. That is, local web server 107 causes local hardware 111 and/or local software 112 to perform the desired action, as specified by input 101. Local hardware 111 and local software 112 returns information—related to the desired action—to local web server 107. Local web server 107 then generates response signals 109 containing information related to the desired action, which was carried out by local hardware 111 and local software 112.

As will be appreciated by those skilled in the relevant art(s) after reading the description herein, "user input 101" as described herein may also be a non-user initiated action. That is, for example, web client 102 may be a GPS-enabled application (executing within web browser environment 103) with a timer that continuously queries to obtain current GPS location via a remote (API) call to local system 104 (i.e., local hardware 111).

As will be apparent to one skilled in the relevant art(s) after reading the description herein, code implementing process 200 (and processes 300-600 described below), that facilitates web-based interaction with a local system may be part of a "standard" version of a web client 102 application that ships from a developer or may be later added as part of an update (or patch). Further, a web client 102 application utilizing an embodiment of the present disclosure advantageously does not need to modify the existing web browser environment 103. That is, in an embodiment, the present disclosure does not change the way that the browser 103 interacts with local system 104 through existing web standards (e.g., Hypertext Transfer Protocol (HTTP), Extensible Markup Lnaguage (XML), RESTful services, etc.). Thus, the present disclosure overcomes the "sandboxing" problem—where the browser defines the local-machine API surface that web-based applications may utilize, forcing device developers to modify the browser should they wish to provide web applications access to additional hardware/software modules on local device 104. More specifically, the sandboxing problem is overcome, in an embodiment, by leaving the browser intact and instead configuring modules 105, 115 to provide an interface to local system 104 or remote server 114, respectively, to expose the (additional) functionality of local hardware 111/software 112 to the web-browser based application 102.

In one embodiment, process 200 in FIG. 2 provides access to local system 104 via a representational state transfer (REST) API set.

Figure 3:
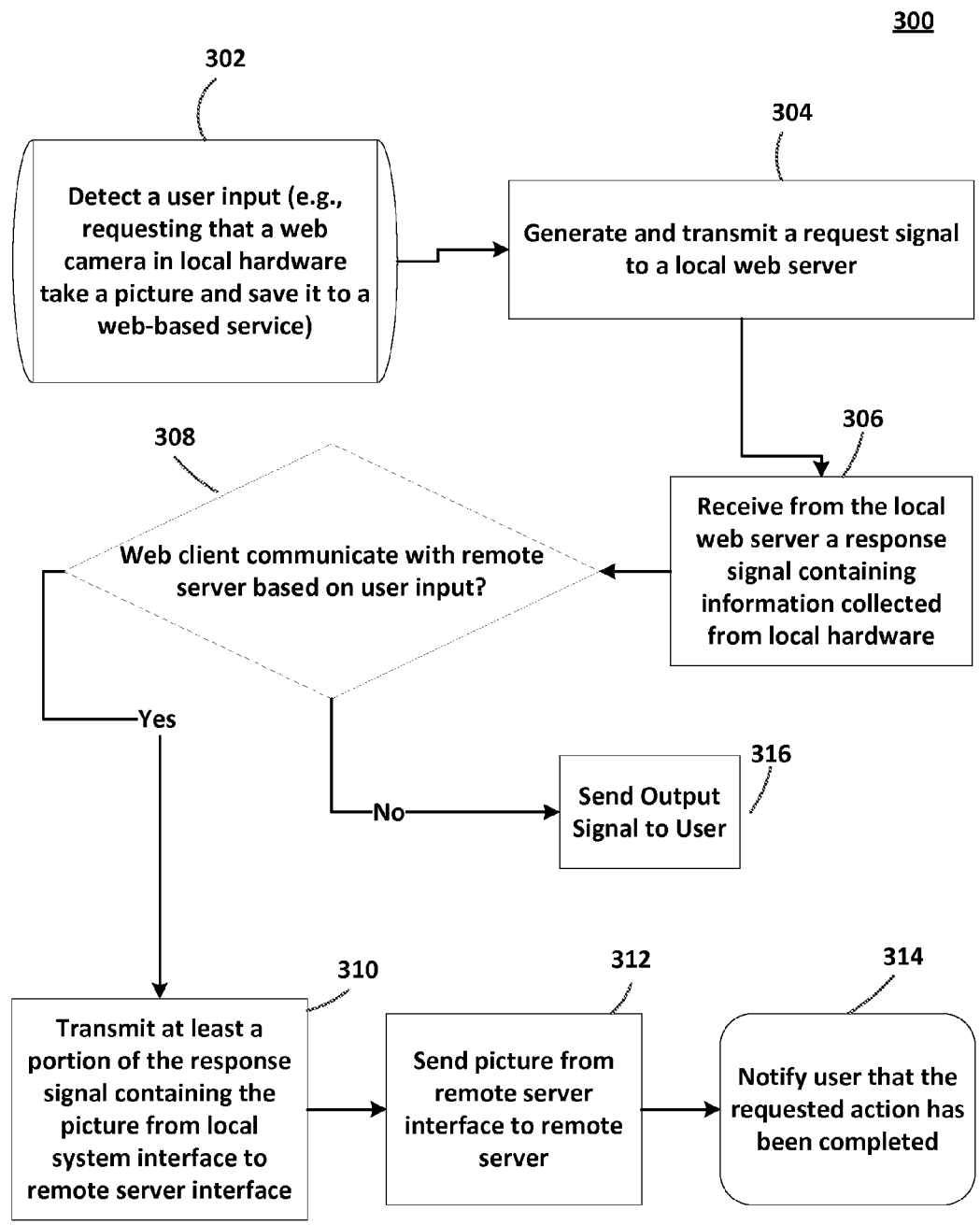
FIG. 3 is a flowchart illustrating an exemplary process for facilitating web-based interaction with a local system, according to an embodiment of the present disclosure.
Figure 4A:
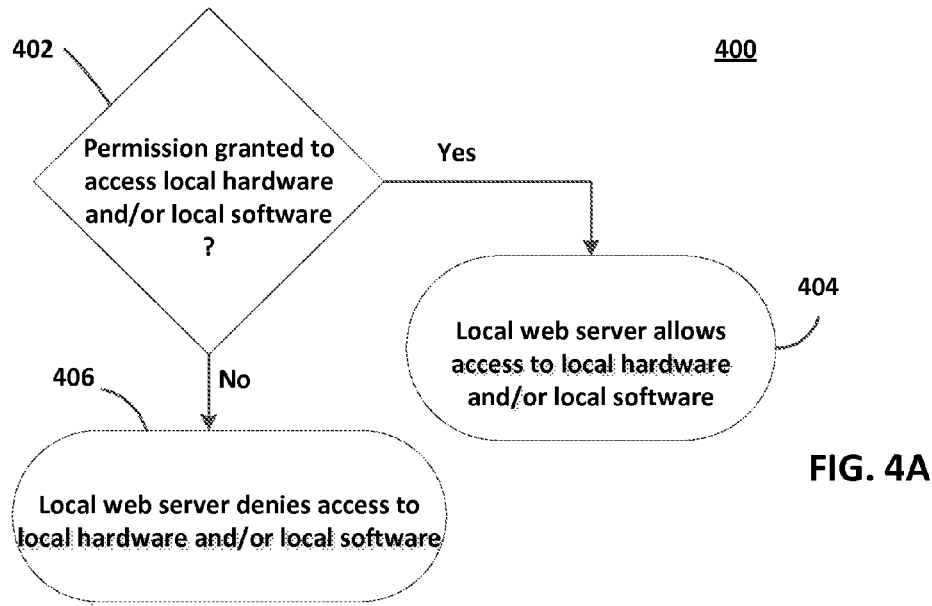
FIGS. 4A-B are flowcharts illustrating exemplary processes for facilitating single-step and multi-step security methods, according to an embodiment of the present disclosure.
Figure 4B:
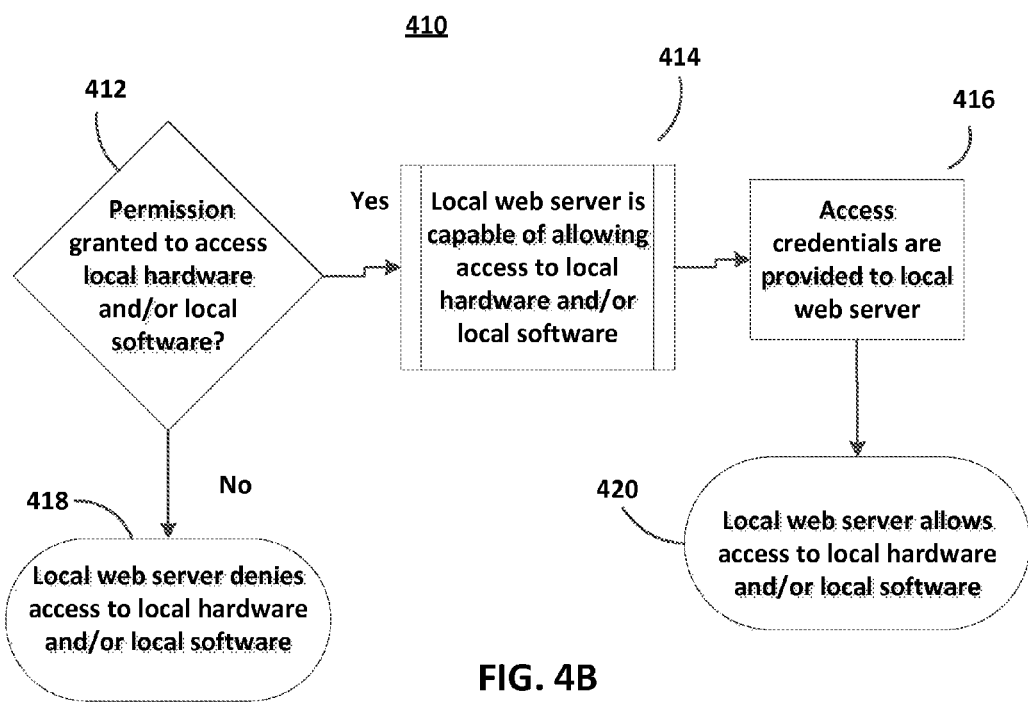

Referring to FIG. 3, a flowchart illustrating an exemplary process for facilitating web-based interaction with a local system, according to an embodiment of the present disclosure, is shown. More specifically, process 300 illustrates an example method of taking a picture with a web camera located within local hardware 111, according to the present disclosure.

In step 302, in response to a user input 101 accepted at web client 102 within web browser environment 103, a picture is saved to a web-based service. In an embodiment, in addition to communicating with local system 104, the user may also access a remote server 114. In an embodiment, remote server 114 is a computing device comprised of a private server, accessible by only user 110. In one embodiment, remote server 114 is a computing device comprised of one or more public servers hosting public, web-based services such as media sharing sites (e.g., FLICKR®), social media services (e.g., FACEBOOK®), remote data back-up services (e.g., DROPBOX®), and location-based services (e.g., FOURSQUARE®).

In step 304, web client 102 communicates with local system 104 in response to user input 101 by causing local system interface 105 to generate and transmit a request signal 106 to local web server 107.

In step 306, in response to user input 101 of user 110, local web server 107 receives a request signal 106 from local system interface 105, and thereby causes the web camera—located at local hardware 111 of local system 104—to take a picture. This information is collected at local web server 107 and response signal 109—containing the information—is sent back to web client 102. In an embodiment, the only information sent back to web client 102 is the picture taken by the web camera. In an embodiment, additional information concerning completion of operation(s) is contained in response signal 109. In yet another embodiment, only a portion of the picture is returned to web client 102 in response signal 109. Similarly, for embodiments where a requested action does not involve taking a picture, (e.g., determining a location of local system 104, reading and/or writing a file, and/or utilizing local hardware 111 output devices) response signal 109 contains all, some, none, or a portion of information accessed and/or generated at local system 104.

In step 308, web client 102 determines, based on user input 101, whether it needs to communicate with remote server 114—remotely located from web browser environment 103—to save the picture to remote server 114 of a web-based service. If it is not necessary for web client 102 to communicate with remote server 114, an output signal is sent to web client 102 indicating to user 110 that the requested action—specified by user input 101—has been completed in step 316. Otherwise, in step 310, response signal 109 is transmitted from local system interface 105 to remote server interface 115. That is, local system interface 105 module transmits at least a portion of response signal 109 containing the picture to remote server interface 115.

In response, remote server interface 115 sends a signal containing the picture to remote server 114 in step 312. In an embodiment, remote server interface 115 provides additional APIs that facilitate interaction with remote server 114; without requiring additional developer knowledge of the configuration of remote server 114. In an embodiment, this is accomplished by providing additional APIs for web-based development models (i.e., HTML, HTML5, CSS, RESTS, JavaScript, etc.). After the picture has been saved to remote server 114 of a web-based service, web client 102 notifies user 110 that the requested action has been completed in step 314.

Referring to FIGS. 4A-B and 5A-B, flowcharts illustrating exemplary processes for facilitating single-step and multi-step security methods, according to embodiments of the present disclosure, are shown. That is, processes 400, 410, 500 and 510 relate to security measures for preventing unauthorized access to local system 104. In an embodiment, access is restricted to local system 104 via APIs providing access to a limited set of local hardware 111 and local software 112. In an embodiment, web client 102 determines whether the action requested by user input 101 will generate an authorized request signal 106. In an embodiment, web client 102 determines whether the action requested by user input 101 is recognized by local system interface 105. If request signal 106 is not an authorized signal, web client 102 will not permit requested action.

The requested action may be authorized either in a single step as in process 400, or in multiple steps as in process 410. Where single-step security process 400 is utilized, a determination is made in step 402 as to whether permission has been granted to web client 102 to access local hardware 111 and/or local software 112. In alternate embodiments, permission may be granted by an administrator of a system containing web client 102, local system 104, and/or an operating system associated with any such computing devices. Permission may also be granted at an API level (e.g., oAuth or authentication using a well-known token, such as API-Key and Permission Flags, etc.). In an alternate embodiment, permissions may be determined and granted by web client 102 based upon digital signatures by the developer, which verifies web client 102 is safe to interact with certain classes of local systems 104.

In single-step security process 400, if permission is granted for web client 102 to access local hardware 111 and/or local software 112, local web server 107 allows access to local hardware 111 and/or local software 112 in step 404. If web client 102 does not have permission, local web server 107 denies access to local hardware 111 and/or local software 112 in step 406. In an embodiment, web client 102 may be configured to display a permission status to user 110 via a GUI.

In multi-step security process 410, permission is provided to the user at multiple stages and/or access credentials are checked at multiple stages of communication between web client 102 and local system 104. When at least two steps are utilized to ensure security of local system 104 is not compromised, it is first determined whether web client 102 has permission to access local system 104 in step 412. If permission is not granted, local web server 107 denies access to local hardware 111 and/or local software 112 in step 418. Where permission is granted for web client 102 to access local hardware 111 and/or local software 112, local web server 107 allows access to local hardware 111 and/or local software 112 in step 414. Access credentials are then provided to local web server 107 in step 416, thereby allowing local web server 107 to access local hardware 111 and/or local software 112 in step 420. In such an embodiment, the two-level authentication process is employed as follows: A first authentication level preferably includes web client 102, wherein web client 102 files (e.g., OPC, CAB, ZIP, or EXE) are digitally signed by the developer to verify that the application is safe to run; and a second authentication level occurs at an API level (e.g., oAuth or authentication using a well-known token such as an API-Key or Permission Flags).

Figure 5A:
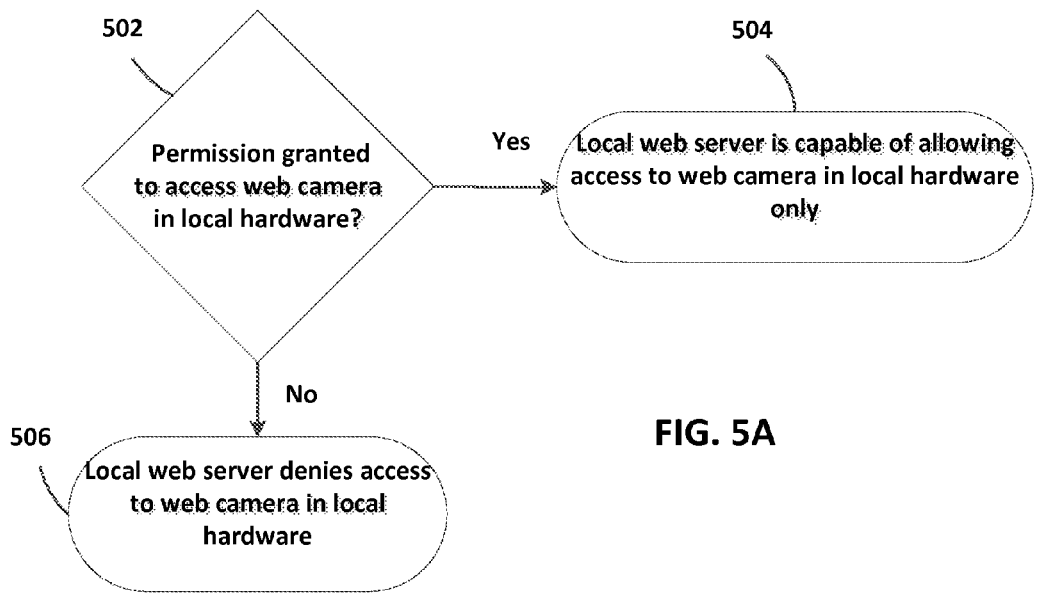
FIGS. 5A-B are flowcharts illustrating exemplary processes for facilitating per-device-based and per-application-based security methods, according to an embodiment of the present disclosure.
Figure 5B:
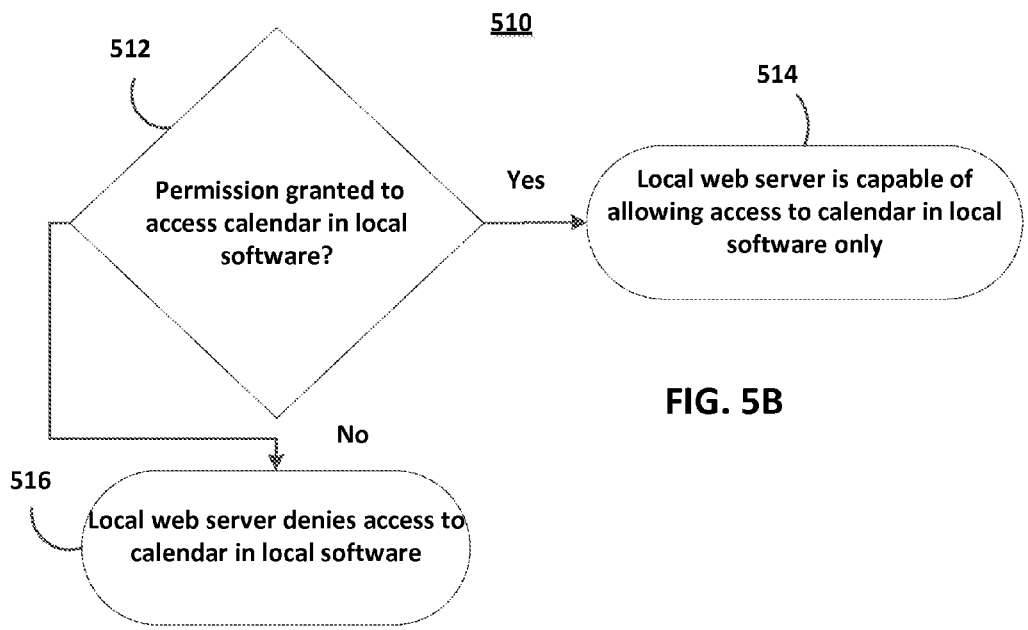

Referring to FIGS. 5A-B, authentication may be handled at least in part on a per-device-basis and/or a per-application-basis, respectively. Per-device-based security process 500 allows or denies access to specific devices in local hardware 111. For example, authentication process 500 may occur at local web server 107 which then determines at step 502 if web client 102 may access a web camera (i.e., a local hardware 111) on local system 104. In step 504, access to the web camera in local hardware 111 is allowed only if permission has been granted. Otherwise, in step 506, permission is denied. In alternate embodiments, permission is granted to access: only one device in local hardware 111; only specific devices in local hardware 111; and/or only specific devices by a limited set of web clients 102.

In an embodiment, per-application-based security process 510 operates in a similar fashion to per-device-based security process 500. However, per-application-based security process 510 allows or denies access to specific applications and/or services in local software 112. For example, process 510 may determine if local web server 107 is allowed access to calendar application residing in local software 112 in step 512. If so, process 510 proceeds to step 514; otherwise process 510 proceeds to step 516. In alternate embodiments, permission is granted to access: only one application in local software 112; only specific application(s), while other specific applications (e.g., operating system kernel) are excluded; and/or specific applications by a limited set of web clients 102.

Various embodiments of the present disclosure utilize some or all of the above-described security processes. When determining whether web client 102 has permission to perform a specific task, an embodiment may verify whether local web server 107, in response to receiving request signal 106, is authorized to communicate with local hardware 111 and/or local software 112.

Figure 6:
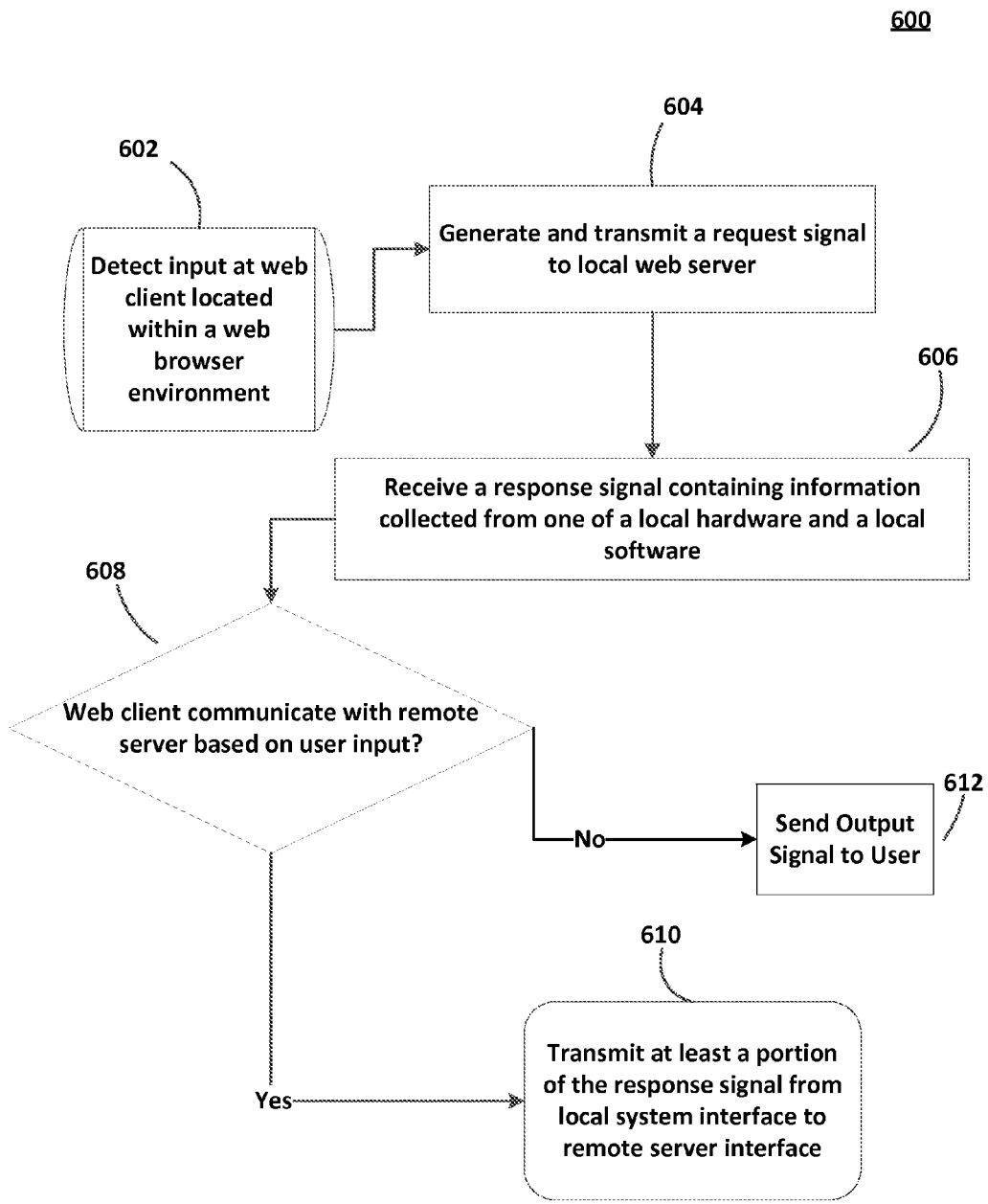
FIG. 6 is a flowchart illustrating an exemplary process for facilitating web-based interaction with a local system, according to an embodiment of the present disclosure.

Referring now to FIG. 6, a flowchart illustrating an exemplary process 600 for facilitating web-based interaction with a local system, according to an embodiment of the present disclosure, is shown. In process 600, steps 602-606 are executed in a similar fashion to steps 202-206 described above, respectively. Then, in step 608, process 600 determines whether web client 102 desires to communicate with remote server 114, which may be remotely located from web browser environment 103. If step 608 is positive, local system interface 105 transmits response signal 109—from local web server 107—to remote server interface 115, and remote server interface 115 sends at least a portion of response signal 109 to remote server 114, as shown in step 610. Otherwise, in step 612, an output signal is sent to wet; client 102 indicating to user 110 that the requested action—specified by user input 101—has been completed.

Figure 8:
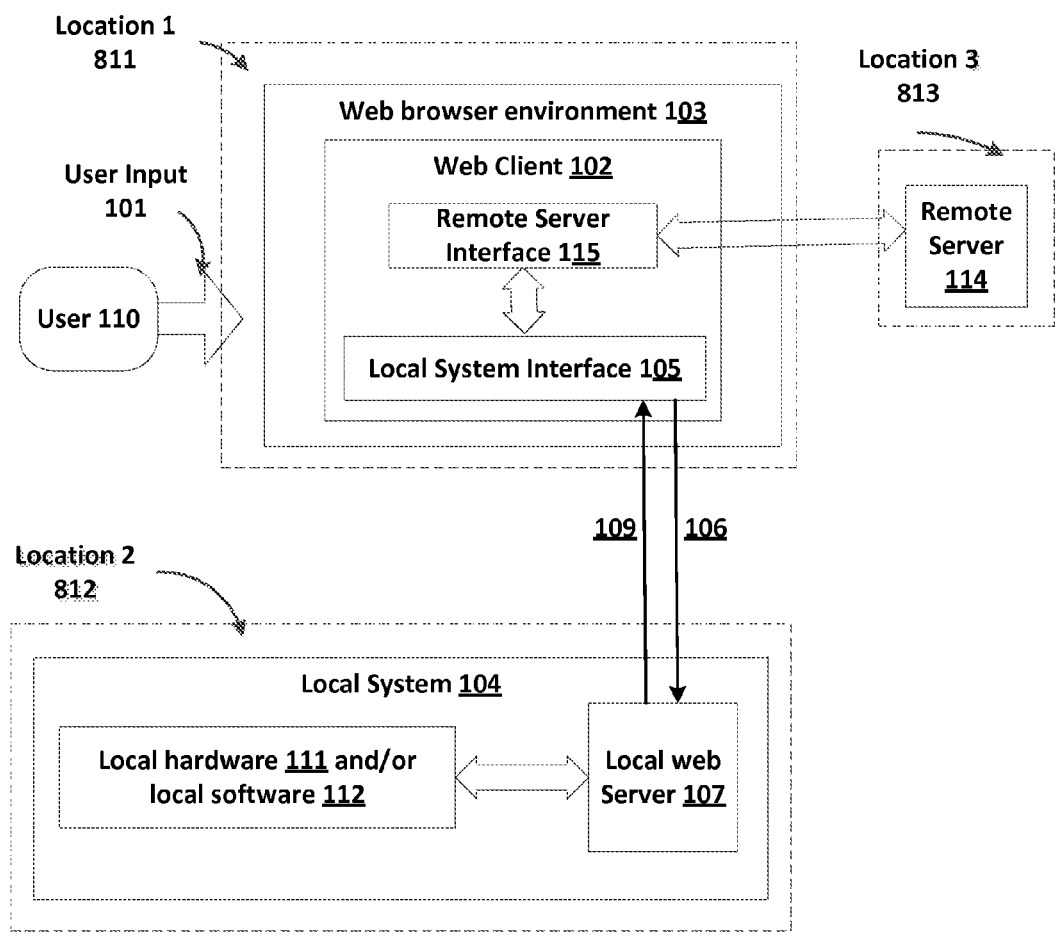
FIG. 8 is a block diagram illustrating an interrelationship between exemplary components that facilitate web-based interaction with a local system, according to an embodiment of the present disclosure.

Referring now to FIG. 8, a block diagram illustrating an interrelationship between exemplary components that facilitate web-based interaction with a local system, according to an embodiment of the present disclosure, is shown. Configuration 800 illustrates it is not necessary for all components of the present disclosure to reside at the same location. That is, in the embodiment of configuration 800, remote server 114 is at "location 3" 813 (e.g., a server room in California). User input 101 is entered at web client 102 residing within web browser environment 103 at "location 1" 811 (e.g., a laptop computer in a coffee shop in New York City). Local system 104 is at "location 2" 812 (e.g., a computing device in Texas). In other exemplary embodiments, some or all of "location 1" 811, "location 2" 812, and "location 3" 813 may reside within a single address.

Figure 9:
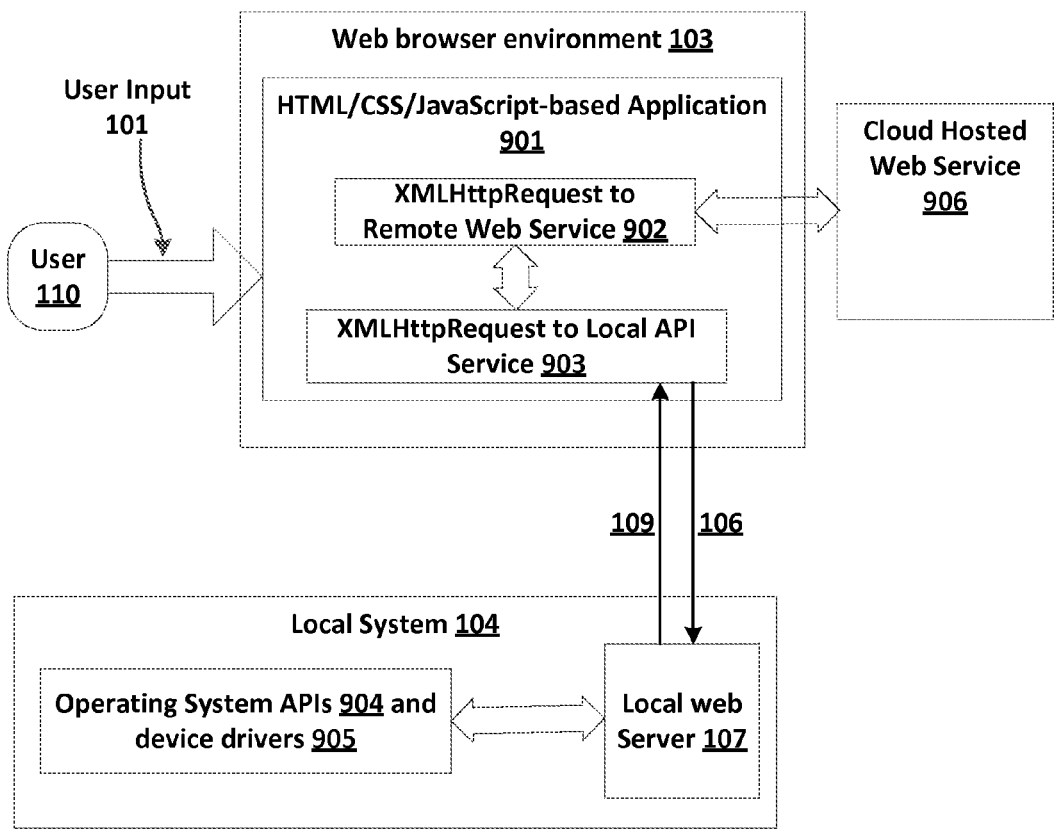
FIG. 9 is a block diagram illustrating an interrelationship between exemplary components that facilitate web-based interaction with a local system, according to an embodiment of the present disclosure.

Referring to FIG. 9, a block diagram illustrating an interrelationship between exemplary components that facilitate web-based interaction with a local system, according to an embodiment of the present disclosure, is shown. That is, configuration 900 includes specific commands that access local system 104. In an embodiment, JavaScript developers use XMLHttpRequest to local API service 903 for making calls to local web server 107. This allows web client (i.e., HTML/CSS/JavaScript-based application 901) to access local device services (e.g., WriteFile to persist content from the running application, a camera API to capture an image from an on-device camera, GPS/Location Framework to obtain a current location, etc.). In such an embodiment, XMLHttpRequest to remote web service 902 and the URL http://localhost/services/camera/capture are used to obtain a photo from a web camera on local system 104. To upload a captured picture to a cloud hosted web service 906 (e.g., the FLICKR® service from Yahoo! Inc. of Sunnyvale, Calif.), the XMLHttpRequest to remote web service 902 uses URL http://api.flickr.com/services/upload/. In alternate embodiments, other operating system APIs 904 and device drivers 905 may be accessed and utilized in a similar manner as described herein above.

Figure 7:
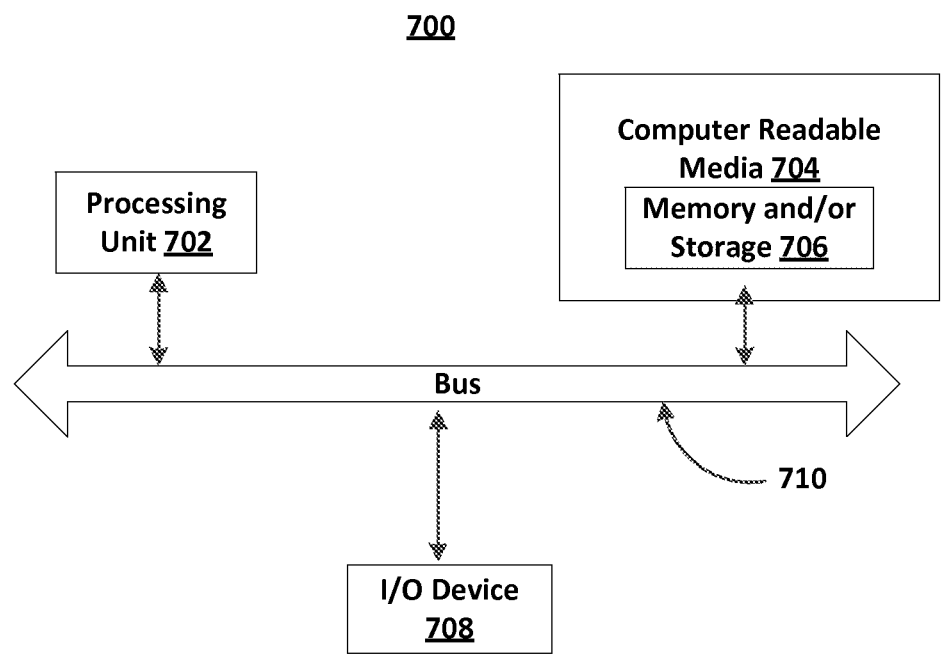
FIG. 7 is a block diagram of a computer system useful for implementing the present disclosure.

Referring now to FIG. 7, a block diagram of an example computing device (or computer system) 700 that can be configured to implement various aspects of time-managing emails, in accordance with one or more embodiments of the present disclosure, is shown. In an embodiment, computing device 700 implements local system 104 (or any other component of configuration 100).

Computing device 700 includes one or more processors or processing units 702, one or more computer readable media 704 which can include one or more memory and/or storage components 706, one or more input/output (I/O) devices 708, and a bus 710 that allows the various components and devices to communicate with one another. Computer readable media 704 and/or one or more I/O devices 708—can be included as part of, or alternatively may be coupled to, computing device 700. Bus 710 represents one or more of several types of bus structures, including a memory bus or memory controller, a peripheral bus, an accelerated graphics port, a processor or local bus, and so forth, using a variety of different bus architectures. Bus 710 may include wired and/or wireless buses.

Memory/storage component 706 represents one or more computer storage media. Memory and/or storage 706 may include volatile media (such as random access memory (RAM)) and/or nonvolatile media (such as read only memory (ROM), Flash memory, optical disks, magnetic disks, and so forth). Memory and/or storage 706 may include fixed media (e.g., RAM, ROM, a fixed hard drive, etc.) as well as removable media (e.g., a Flash memory drive, a removable hard drive, an optical disk, etc.).

The techniques discussed herein may be implemented in software, with instructions executed by one or more processing units 702. It is to be appreciated that different instructions can be stored in different components of computing device 700, such as in a processing unit 702, in various cache memories of a processing unit 702, in other cache memories of device 700 (not shown), on other computer readable media, and so forth. Additionally, it is to be appreciated that the location where instructions are stored in computing device 700 may change over time.

One or more I/O devices 708 allow a user to enter commands and information to computing device 700, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media may be any available medium or media that can be accessed by a computing device. By way of example, and not limitation, computer readable media may comprise "computer storage media" and "communications media."

"Computer storage media" include volatile and non-volatile, and removable and non-removable media implemented in any method or technology for storage of information such as computer readable instructions, data structures, program modules, or other data. Computer storage media include, but are not limited to, RAM, ROM, EEPROM, Flash memory or other memory technology, CD-ROM, digital versatile disks (DVD) or other optical storage, magnetic cassettes, magnetic tape, magnetic disk storage or other magnetic storage devices, and/or any other medium which can be used to store the desired information and which can be accessed by a computer.

"Communication media" typically embody computer readable instructions, data structures, program modules, or other data in a modulated data signal such as carrier wave or other transport mechanism. Communication media may also include any information delivery media. The term "modulated data signal" means a signal that has one or more of its characteristics set or changed in such a manner as to encode information in the signal. By way of example and not limitation, communication media include wired media, such as a wired network or direct-wired connection, and wireless media, such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry, system on a chip), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code may be stored in one or more computer readable memory devices. The features of the present disclosure described herein are platform-independent, meaning that the techniques may be implemented on a variety of commercial computing platforms having a variety of processors.

As will be apparent to one skilled in the relevant art(s) after reading the description herein, computing device 700 may be configured as any number of computing devices such as a game console, a portable media player, a desktop, a laptop, a server, a notebook computer, a tablet computer, a PDA, a mobile computer, a smart telephone, a mobile telephone, an intelligent communications device or the like.

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality, and advantages of the present disclosure, are presented for example purposes only. The present disclosure is sufficiently flexible and configurable, such that it may be implemented in ways other than that shown in the accompanying figures.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. At a computer system, the computer system including a local web client operating within a web browser environment at the computer system and including a local web server operating in association with an operating system of the computer system, the web browser environment in a sandbox, the sandbox permitting web based communication to components outside the sandbox and the sandbox preventing issuance of local resource commands to directly control any of a plurality of local resources at the computer system, a method for web-based acquisition of data from a local resource, from among the plurality of local resources, at the computer system, the method executing on at least one processor of the computer system, the method comprising:

receiving input at the web client, the input directed to a web-based service running within the web browser environment, the input instructing the web-based service to acquire data from the local resource by performing a specified action, the web-based service previously loaded from a remote server, the web-based service including a selected portion of an communication Application Programming Interface (API) targeted to interact with the local resource;

the web client environment acquiring data from the local resource through web based communication not withstanding that the sandbox prevents the web client from issuing local resource commands to the local resource, including:

a local system interface of the web client using the selected portion of the communication Application Programming Interface (API) to communicate a web protocol request signal to the local web server in response to receiving the input, the local web server including an interface for translating between web protocol signals and corresponding local resource commands, the local resource commands for controlling the local resource to acquire data in accordance with received web protocol request signals; and the local system interface receiving a web protocol response signal from the local web server, the web protocol response signal responsive to the web protocol request, the web protocol response signal containing acquired data that was acquired by the local web server, wherein the local web server acquired the acquired data by issuing the corresponding local resource commands to the local resource to control the local resource to perform the specified action at the local resource.

2. The method of claim 1, further comprising:
verifying whether the request signal is an authorized signal recognized by the local system interface.

3. The method of claim 1, wherein receiving input at the web client comprises receiving input requesting that data be acquired from a local resource for delivery to a remote server; and further comprising:
the local system interface transferring the acquired data within the sandbox to a remote system interface of the web client, the remote system interface configured to exchange data with remote servers; and
the remote system interface sending the acquired data to the remote server.

4. The method of claim 1, further comprising:
determining whether the web client desires to communicate with a remote server remotely located from web browser environment.

5. The method of claim 4, further comprising:
the local system interface transmitting the web protocol response signal to a remote server interface operating within the web browser environment; and
the remote server interface sending the web protocol response signal, from the web client, to the remote server so as to supplement the functionality of the remote server with the functionality of the local resource.

6. The method of claim 5, further comprising receiving from the remote server, in response to transmitting the web based response signal, a second response signal containing information collected from one of a remote hardware and a remote software, located at, and operated by, the remote server.

7. The method of claim 1, further comprising presenting, to the user interface screen, an output based upon the input and at least a portion of the information contained in the response signal; wherein the application executing on the computing device is a web-based service.

8. The method of claim 1, wherein the local system interface is an application programming interface (API) located within the web client which facilitates communications between the sandboxed web client environment and the local web server.

9. The method of claim 1, wherein the web client environment includes a user interface, wherein receiving input at the web client comprises receiving user input at the user interface; and
wherein the web client environment acquiring data from the local resource comprises the web client environment acquiring data from the local resource without the computer system shifting focus from the user interface.

10. The method of claim 1, wherein the acquired data is generated by the local resource in response to being controlled by the local web server.

11. The method of claim 10, wherein the acquired data is a digital image generated by a camera in response to being controlled by the local webs server.

12. A computer program product for use at a computer system, the computer system including a local web client operating within a web browser environment at the computer system and including a local web server operating in associated with an operating system of the computer system, the web browser environment in a sandbox, the sandbox permitting web based communication to components outside the sandbox and the sand box preventing issuance of local resource commands directly control any of a plurality of local resources at the computer system, the computer program product for implementing a method for web based acquisition of data from a local resource, from among the plurality of local resources, at the computer system, the computer program product comprising one or more volatile or non-volatile media having stored thereon computer-executable instructions that, when executed by a processor cause the computer system to perform the method, including the following:

receive input at the web client, the input directed to a web-based service running within the web browser environment, the input instructing the web-based service to acquire data from the local resource by performing a specified action, the web-based service previously loaded from a remote server, the web-based service including a selected portion of an communication Application Programming Interface (API) targeted to interact with the local resource;

use the selected portion of the communication Application Programming Interface (API) to communicate, from a local system interface of the web client, a web protocol request signal to the local web server in response to receiving the input, the local web server including an interface for exchanging signals with the local system interface for translating between web protocol signals and corresponding local resource commands, the local resource commands for controlling the local resource to acquire data in accordance with received web protocol request signals; and receive, at the local system interface, a web protocol response signal from the local web server, the web protocol response signal responsive to the web protocol request, the web protocol response signal containing acquired data acquired by the local web server, the acquired data acquired by the local web server issuing the corresponding local resource commands to the local resource to control the local resource to perform the specified action at the local resource.

13. The computer program product as recited in claim 12, further comprising computer-executable instructions that, when executed, cause the computer system to verify whether the request signal is an authorized signal recognized by the local system interface.

14. The computer program product as recited in claim 12, wherein computer-executable instructions that, when executed, cause the computer system to receive input at the web client comprise computer executable instructions that, when executed, cause the computer system to receiving input requesting that data be acquired from a local resource for delivery to a remote server;

further comprising computer-executable instructions that, when executed, cause the computer system to:
transfer the acquired data within the sandbox from the local system interface to a remote system interface of the web client, the remote system interface configured to exchange data with remote servers; and
send the acquired data from the remote system interface to the remote server.

15. The computer program product as recited in claim 12, wherein the local resource is one of: a camera; a scanner; a GPS antenna; a sensor; and a motor.

16. The computer program product as recited in claim 12, wherein the computer system is chosen from the group consisting of: a desktop computer; a mobile computer; a server; a tablet computer a PDA; and a mobile telephone.

17. The computer program product as recited in claim 12, further comprising computer-executable instructions that, when executed, cause the computer system to:
determine whether the web client desires to communicate with a remote server remotely located from web browser environment.

18. The computer program product as recited in claim 17, further comprising computer-executable instructions, that when executed cause the computer system to:
transmit the web protocol response signal from the local system interface to a remote server interface operating within the web browser environment; and
send the web protocol response signal, from the remote server interface, to the remote server so as to supplement the functionality of the remote server with the functionality of the local resource.

19. A computer system, the computer system comprising:
one or more processors;
system memory;
one or more additional local resources;
one or more storage devices, the one or more storage devices having stored thereon computer executable instructions representing an operating system, a web client, and a local web server, wherein the operating system is configured to:
sandbox the web client in a web browser environment that is prevented from directly accessing the one or more additional local resources and that permits web based communication to components outside the sandbox;
wherein the web client includes a local system interface and wherein the web client is configured to:
receive input, the input directed to a web-based service running within the web browser environment, the input instructing the web-based service to acquire data from a local resource by performing a specified action, the local resource among the one or more additional local resources, the web-based service previously loaded from a remote server, the web-based service including a selected portion of an communication Application Programming Interface (API) targeted to interact with the local resource; and
wherein the local system interface is configured to:
use the selection portion of the communication Application Programming Interface (API) to communicate a web protocol request signal to the local web server in response to receiving the input, the web protocol request signal communicated by transmission to the local web server; and
receiving a web protocol response signal from the local web server, the web protocol response signal containing acquired data that was acquired by the local web server; and
wherein the local web server includes an interface for exchanging web protocol signals with the local system interface and includes an interface for translating web protocol signals and corresponding local resource commands, the local resource commands for controlling the local resource to acquire data in accordance with received web protocol request signals and wherein the local web server is configured to:
receive the web protocol request signal from the local system interface;
acquire data by controlling the local resource to perform the specified action at the local resource; and
send a web protocol response signal to the local system interface, the web protocol response signal containing the acquired data.

20. The system of claim 19, wherein the one or more storage devices having stored thereon computer executable instructions further representing a remote server interface, wherein the remote server interface is configured to communicate with remote web servers.

* * * * *